Nov. 7, 1950
B. B. McHAN
2,529,405
STABILIZED COMPOSITION
Filed June 1, 1949
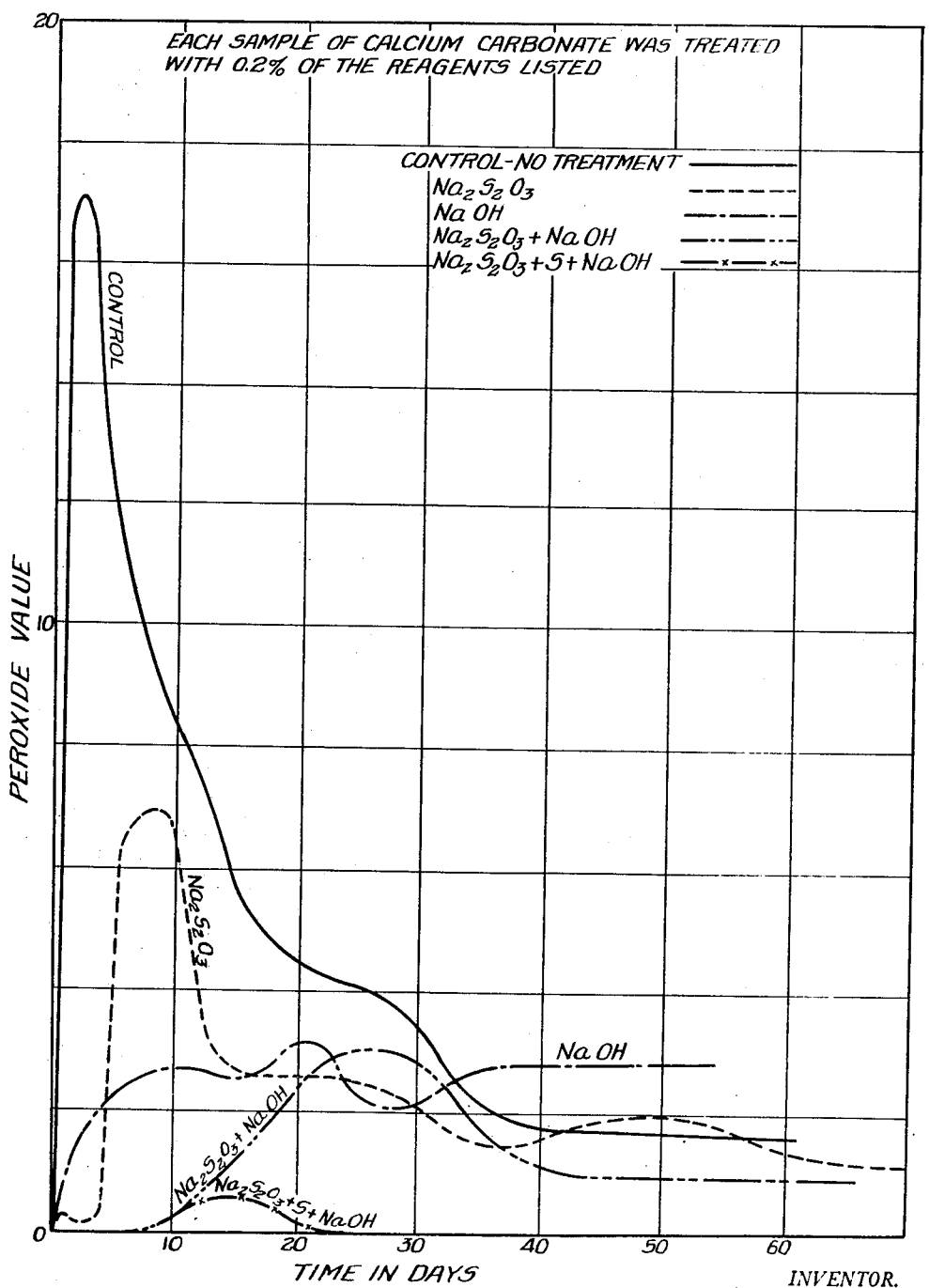

Patented Nov. 7, 1950

2,529,405

UNITED STATES PATENT OFFICE 2,529,405

STABILIZED COMPOSITION

Brack B. McHan, Quincy, Ill., assignor to Calcium Carbonate Company, Chicago, Ill., a corporation of Illinois Application June 1, 1949, Serial No. 96,487

3 Claims. (Cl. 99—2)

This invention relates to improvements in the stabilization of chemical compounds and is a continuation-in-part of my allowed co-pending application Ser. No. 661,247, filed April 11, 1946 (issued as Patent No. 2,479,583 on August 23, 1949), which in turn is a continuation-in-part of my previous application Ser. No. 478,938, filed March 12, 1943, which issued on July 2, 1946 as Patent No. 2,403,010. More particularly, it pertains, for example, to the stabilization of calcium compounds, such as limestone, to be used as an ingredient in food products, or the like, without fear that it will materially destroy the vitamin content or develop rancidity in the remaining ingredients, and this is a principal object of the invention.

Calcium carbonate, in the form of ground limestone, is a commonly used ingredient in feed mixtures. It is used in percentages varying from 1 to 5 per cent. Calcium carbonate is a necessary component of the diet. The addition of calcium carbonate to food is deemed necessary in order to maintain the correct balance or ratio of calcium and phosphorus and to insure the normal development of the skeletal structure as well as to maintain the necessary balance of calcium in the blood stream and the other organic portions of the normal animal structure.

To supply the necessary calcium requirement it is common practice of feeders of all classes of livestock to introduce into the mixed feed a necessary quantity of calcium. This is usually introduced in the form of pulverized limestone. It is also conventional practice to fortify feed products with various vitamin concentrates in order to insure a necessary amount of these very important ingredients being present at all times. Vitamin A may be added in the form of carotene, various fish oils, or alfalfa meal. Vitamin D is usually added through the medium of one of the fish liver oils, or by means of any other suitable vehicle. Most of the common forms of feed stuff, such as alfalfa hay or meal, corn meal (especially yellow corn meal), grains and grain products, carry varying percentages of various vitamins and oils. Vitamins are very readily destroyed by processes of oxidation. As an example, the vitamin A content of alfalfa meal will be reduced as much as 50 per cent in less than two months time due to oxidation of the vitamin A molecule.

The oils present in the natural feed stuffs also undergo processes of oxidation resulting in the development of varying degrees of rancidity. The rancid odor developed through oxidation of the oils impairs the attractiveness and palatability of the food, and greatly reduces its biological activity by the accompanying destruction of vitamins. The development of rancidity is accompanied by the development of substances known as peroxides; these peroxides in turn further oxidize the vitamins, oils, and natural enzymes of feed materials.

Generally, it is an object of the invention to overcome the foregoing difficulties and disadvantages by effectively lowering the oxidation-reduction potential of useful compounds, both inorganic as well as organic, the latter comprising, in particular, animal and vegetable products.

More specifically, it is an object of the invention to stabilize calcium carbonate by combining sodium hydroxide therewith over its reactive area and reacting the sodium hydroxide with the calcium carbonate to provide a composition having as its essential property an adsorption isotherm of such characteristic that oxygen adsorbed by the calcium carbonate is replaced and further adsorption of oxygen by the carbonate is prevented, to the end that the composition, when used, for example, as an ingredient of food, will not destroy vitamins nor initiate rancidity development.

Other objects of the invention will in part be obvious and will in part appear hereinafter.

The invention accordingly comprises the several steps and the relation of one or more of such steps with respect to each of the others, and the product possessing the features, properties, and the relation of constituents, which are exemplified in the following detailed disclosure, and the scope of the application of which will be indicated in the claims.

The sole figure is a graphic illustration of the effect of the various reagents herein, singly and in combination, on the peroxide value showing the peroxide development plotted against time in days and depicts the high oxidizing capacity of untreated calcium carbonate and the reducing effect of each of the reagents when used singly, and still further the great reduction in oxidizing value when used in combination.

The problem of rancidity development and destruction of vitamins in food products has long confronted the industry and solutions thereto have constantly been sought. No one familiar with the chemistry of calcium carbonate would attribute thereto a high oxidizing capacity. Indeed, a contrary view has been inevitably obtained. The molecule of calcium carbonate is an extremely stabile one with the oxygen molecules so tightly bound that they would not be transferred in any ordinary processes of oxidation. This statement is susceptible to both chemical and thermodynamic proof. Hence, this material has heretofore been eliminated as being among one of the chief causes that give rise to the problem.

The present invention, however, is based on my discovery that calcium carbonate is the primary cause of vitamin destruction and rancidity development in this connection. I have found that during the processes of grinding and attrition of the calcium carbonate, the surfaces of the particles presented unsaturated chemical bonds which picked up, at activated points, oxygen atoms from the air. Also, that the oxidizing action of the adsorbed oxygen on the surface of the carbonate particles could completely be nullified or replaced by some substance preferentially adsorbed over the oxygen, and that the chemical nature of this substance must have an adsorption isotherm that would effectively prevent the carbonate from adsorbing further oxygen on storage.

It was further observed that on many of the surfaces of the calcium carbonate particles the oxygen atom may be closely compacted and in a highly reactive state. When a particle of calcium carbonate, carrying its charge of adsorbed oxygen atoms, comes into contact with an oxidizable substance, these oxygen atoms are transferred and the substance oxidized. It has also been noted that very quickly after mixing an oxidizable substance with calcium carbonate, such, for example, as vitamin A, fish oils, or carotene, that 90 per cent plus will be oxidized. This, however, does not neutralize the oxidizing capacity of the calcium carbonate as these activated points on the crystal simply pick up more oxygen atoms from the air and again transfer them to oxidizable substances. This process goes on until the oxidizable substance has been completely saturated with oxygen.

As a result of these combined discoveries and observations the problem at hand has been solved by a process of subjecting the calcium carbonate to the action of a suitable stabilizing agent which, by adsorption, effectively will reduce the oxidation-reduction potential, either before, during or after grinding of the calcium carbonate. An actual process of treatment will now be described as set forth in the following examples:

*Example 1*

Four pounds (i. e. 0.2 per cent) of NaOH were intimately mixed with one ton of calcium carbonate during the process of grinding. This caused a drop in the oxidation-reduction potential of the calcium carbonate sufficiently low so as effectively to inhibit its normal oxidizing reaction on such substances as vitamins and oils for periods as long as nine months. The following table compares the development of rancidity in 2,000 A, 400 D fish oil by untreated limestone and limestone treated in accordance with this example. In this table, the redox potential is designated as $E_H$. It is significant to note the development of high peroxide values with untreated limestone as compared with the relatively low peroxide values developed with the limestone treated with 0.2 per cent NaOH.

TABLE 1

| Time | Qcy No. 4 Reg. Control $E_H$—0.3933 | Qcy No. 4 Reg. 0.2% NaOH $E_H$—0.3272 |
| --- | --- | --- |
| Day of Prep | 3.18 | 0.0 |
| 1 day | 14.9 | 0.80 |
| 2 days | 17.1 | 1.30 |
| 3 days | 16.8 | 1.59 |
| 4 days | 12.2 | 2.17 |
| 5 days | 12.6 | 2.89 |
| 6 days | | 2.39 |
| 7 days | 10.35 | 2.46 |
| 8 days | | |
| 10 days | 9.11 | 2.65 |
| 13 days | | |
| 14 days | | 2.60 |
| 16 days | | |
| 17 days | 4.47 | |
| 20 days | | |
| 21 days | | 3.17 |
| 23 days | | |
| 24 days | 4.11 | |
| 27 days | | |
| 28 days | | 2.02 |
| 31 days | | |
| 34 days | | |
| 35 days | | 2.70 |
| 36 days | | |
| 37 days | | |
| 40 days | 1.75 | |
| 46 days | | |
| 50 days | | |
| 54 days | | 2.81 |
| 56 days | | |
| 58 days | | |
| 61 days | 1.48 | |
| 66 days | | |
| 73 days | | |
| 91 days | | |
| 92 days | | |
| 93 days | | |
| 95 days | 1.69 | 3.99 |
| 4 months | 1.56 | 3.27 |
| 6 months | 1.39 | 1.93 |
| 9 months | 1.53 | 1.76 |

It has been found that the NaOH is effective in treating limestone in accordance with this invention in percentages ranging from 0.1 to 0.5 per cent based on the weight of the limestone. The preferred range of concentration is from 0.1 to 0.3 per cent by weight of the limestone.

*Example 2*

Sodium thiosulfate, 0.5 per cent, was mixed with one ton of calcium carbonate during the process of grinding. This caused a drop in the oxidation-reduction potential of the calcium carbonate sufficiently low effectively to inhibit its oxidizing reaction on such substances as vitamins and oils. Vitamins and vitamin carrying products when mixed with calcium carbonates thus treated remained 70 per cent to 80 per cent stabile up to six months time, whereas in untreated calcium carbonate they would be completely destroyed in less than a week. Oils and food products containing oils or fats when mixed with the treated calcium carbonate retained their original fresh odor without any development of rancidity for over a year.

With respect to the relative weights of materials used, it has been found that sodium thiosulfate is desirably effective in percentages ranging from 0.1 per cent to 0.5 per cent, which is equivalent to two pounds and ten pounds of sodium thiosulfate per ton of limestone respectively. While this is a preferred range, desirable results have been secured from percentages varying from 0.01 per cent up to and in excess of 1.0 per cent.

The data presented in the two following tables will serve further to show the advantages to be obtained in treating limestone in accordance with my invention.

TABLE 2

*Rancidity development in 1% A—D oil mixtures effect of sulfur, sodium thiosulfate and sodium hydroxide on peroxide values*

| Reagent | Peroxide Value After Number of Days Shown | | | | | | | | | | |
|---|---|---|---|---|---|---|---|---|---|---|---|
| | 1 | 2 | 3 | 5 | 10 | 15 | 20 | 30 | 40 | 50 | 60 |
| Control | 14.9 | 17.1 | 16.8 | 12.6 | 8.4 | 5.6 | 4.5 | 3.4 | 1.7 | 1.6 | 1.5 |
| 0.2% Sodium Thiosulfate | 0.4 | 0.2 | 0.2 | 5.0 | 6.8 | 2.7 | 2.6 | 2.0 | 1.6 | 1.9 | 1.4 |
| 0.2% Sodium Hydroxide | 0.8 | 1.3 | 1.8 | 2.3 | 2.7 | 2.6 | 3.1 | 2.2 | 2.8 | 2.8 | 2.8 |
| 0.2% Sodium Thiosulfate+0.2% Sodium Hydroxide | 0.4 | 0.1 | 0.0 | 0.0 | 0.2 | 1.2 | 2.4 | 2.7 | 1.1 | 0.9 | 1.0 |
| 0.1% Sodium Thiosulfate+0.2% Sulfur+0.2% Sodium Hydroxide | 0.0 | 0.0 | 0.0 | 0.0 | 0.2 | 0.6 | 0.2 | | | | |

TABLE 3

*Oxidation—reduction values for various reagents*

$E_H$ = Oxidation—Reduction Potential (Redox)

| Reagents | $E_H$ |
|---|---|
| Control | 0.3933 |
| 0.2% Sodium Thiosulfate | 0.3113 |
| 0.2% Sodium Hydroxide | 0.3272 |
| 0.2% Sodium Thiosulfate+0.2% Sodium Hydroxide | 0.3388 |
| 0.1% Sodium Thiosulfate+0.2% Sulfur+0.2% Sodium Hydroxide | 0.3108 |

From all of the foregoing uses, and others, it appears that any chemical compound or reagent, used in accordance with the teachings of the present invention, and which possesses the property of a high degree of adsorption on limestone particles, that is, will have an adsorption isotherm of such characteristic that it would cause the replacement of adsorbed oxygen, and would effectively prevent any further adsorption of oxygen by the calcium carbonate particles, should act as an effective stabilizer.

The oxidation-reduction potential, or redox potential, in all cases was measured by means of a potentiometer and it should be noted that in order to secure the best results, a redox potential value of preferably around +0.35 should not be exceeded.

It should further be noted that the present invention contemplates adaption to other fields of industrial usage. The property of undergoing spontaneous oxidation when exposed to the atmosphere is by no means peculiar to edible fats, but is exhibited also by many other substances of biological and industrial importance. For example, cases outside of the field of the preservation of food are the aging or perishing of rubber, the formation of gum in gasoline, production of sludge in mineral, lubricating and transformer oils, and the oxidation and resinfication of essential oils.

In addition to the foregoing, prevention of the development of rancidity and vitamin loss and vitamin-carrying substances are important in the pharmaceutical trade as, for instance, the inclusion of vitamins in tablets or capsules where various substances are used as carriers.

The invention can also be adapted in the field of paint and paint oils where many calcium carbonates when mixed with certain types of oils accelerate the oxidation thereof. In addition to calcium carbonate, other finely ground powders, such as Lithopone, White Lead, Titanox, China Clay, and Barytes, can thus be treated.

Since changes when carrying out the above process, and certain modifications in the composition which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Particularly, it is to be understood that in said claims, ingredients or compounds recited in the singular are intended to include compatible mixtures of such ingredients wherever the sense permits.

Having described my invention, what I claim as new and desire to secure by Letters Patent is:

1. A stabilized composition of matter comprising discrete particles of calcium carbonate, and sodium hydroxide as an oxidation-reduction potential reducing substance, said substance preferentially being adsorbed over oxygen reaction areas of said calcium carbonate.

2. A stabilized composition of matter comprising discrete particles of calcium carbonate and from 0.1 to 0.5 per cent of sodium hydroxide as an oxidation-reduction potential reducing substance, said substance being preferentially adsorbed over oxygen reaction areas of said calcium carbonate.

3. A stabilized composition of matter comprising discrete particles of calcium carbonate and from 0.1 to 0.3 per cent of sodium hydroxide as an oxidation-reduction potential reducing substance, said substance being preferentially adsorbed over oxygen reaction areas of said calcium carbonate.

BRACK B. McHAN.

REFERENCES CITED

The following references are of record in the file of this patent:

UNITED STATES PATENTS

| Number | Name | Date |
|---|---|---|
| 2,152,438 | McHan | Mar. 28, 1939 |
| 2,198,223 | Muskat et al. | Apr. 23, 1940 |
| 2,403,010 | McHan | July 2, 1946 |
| 2,479,583 | McHan | Aug. 23, 1949 |